(12) United States Patent
Clausen

(10) Patent No.: US 12,209,907 B2
(45) Date of Patent: Jan. 28, 2025

(54) METHOD OF DETERMINING AN OPTICAL PATHLENGTH THROUGH A CUVETTE

(71) Applicant: Foss Analytical A/S, Hilleroed (DK)

(72) Inventor: Jeppe Sandvik Clausen, Hilleroed (DK)

(73) Assignee: FOSS Analytical A/S, Hilleroed (DK)

( * ) Notice: Subject to any disclaimer, the term of this patent is extended or adjusted under 35 U.S.C. 154(b) by 255 days.

(21) Appl. No.: 17/784,870

(22) PCT Filed: Oct. 15, 2020

(86) PCT No.: PCT/IB2020/059690
§ 371 (c)(1),
(2) Date: Jun. 13, 2022

(87) PCT Pub. No.: WO2021/144630
PCT Pub. Date: Jul. 22, 2021

(65) Prior Publication Data
US 2023/0011975 A1    Jan. 12, 2023

(30) Foreign Application Priority Data

Jan. 16, 2020 (DK) .............................. PA202000051

(51) Int. Cl.
*G01J 3/427* (2006.01)
*G01N 21/03* (2006.01)
*G01N 21/27* (2006.01)

(52) U.S. Cl.
CPC .......... *G01J 3/427* (2013.01); *G01N 21/0303* (2013.01); *G01N 21/274* (2013.01)

(58) Field of Classification Search
CPC ......... G01N 21/274; G01N 2021/3595; G01N 2201/129; G01N 21/3577; G01N 21/0303;
(Continued)

(56) References Cited

U.S. PATENT DOCUMENTS 5,347,475 A    9/1994  Taylor et al.
5,446,681 A    8/1995  Gethner et al.
(Continued)

FOREIGN PATENT DOCUMENTS

EP    2543988 A1    1/2013
JP    S60183560 A   9/1985
(Continued)

OTHER PUBLICATIONS

Ossia, C. V., and H. Kong. "Novel chromatic technique based on optical absorbance in characterizing mineral hydraulic oil degradation." Advances in Tribology 2012 (2012) (Year: 2012).*
(Continued)

*Primary Examiner* — Tarifur R Chowdhury
*Assistant Examiner* — Roberto Fabian, Jr.
(74) *Attorney, Agent, or Firm* — Harness, Dickey & Pierce, P.L.C.

(57) ABSTRACT

A method for determining an optical pathlength through a cuvette of a spectrophotometric apparatus includes obtaining a first single beam spectrum of a liquid zero-material at least in a first energy region in which the liquid zero-material absorbs at least a portion of incident optical radiation; obtaining a second single beam spectrum of a second liquid at least in the first energy region, the second liquid having a composition excluding the liquid zero-material and having no absorption of incident optical radiation in the first energy region; determining a dual beam spectrum of the liquid zero-material relative to the second liquid at least in the first energy region from the first and second single beam spectra;
(Continued)

and calculating an optical pathlength through the cuvette based on processing spectral information obtained from the first energy region of the determined dual beam spectrum.

18 Claims, 5 Drawing Sheets

(58) Field of Classification Search
CPC ......... G01N 21/35; G01N 2201/12746; G01N 21/11; G01J 3/42; G01J 3/427
See application file for complete search history.

(56) References Cited

U.S. PATENT DOCUMENTS

| | | | |
|---|---|---|---|
| 5,933,792 | A | 8/1999 | Andersen et al. |
| 9,874,515 | B2 | 1/2018 | Hansen |
| 2003/0232448 | A1* | 12/2003 | Shelley .............. G01B 11/0625 436/164 |
| 2013/0010293 | A1* | 1/2013 | Okubo ................. G01N 21/274 356/244 |
| 2015/0276588 | A1* | 10/2015 | Marshall ................ G01N 21/35 250/343 |
| 2015/0276589 | A1* | 10/2015 | Wagner .............. G01N 15/1404 356/440 |
| 2016/0123870 | A1* | 5/2016 | Hansen ................ G01N 21/274 356/402 |
| 2017/0205338 | A1* | 7/2017 | Coates ...................... G01J 3/00 |

FOREIGN PATENT DOCUMENTS

| | | |
|---|---|---|
| WO | WO-0181899 A2 | 11/2001 |
| WO | WO-2013/026466 A1 | 2/2013 |
| WO | WO-2014/194935 A1 | 12/2014 |

OTHER PUBLICATIONS

International Search Report for International Application No. PCT/IB2020/059690 dated Dec. 11, 2020.
Written Opinion for International Application No. PCT/IB2020/059690 dated Dec. 11, 2020.
Danish Search Report For Danish Patent Application No. PA202000051 dated Mar. 13, 2020.

* cited by examiner

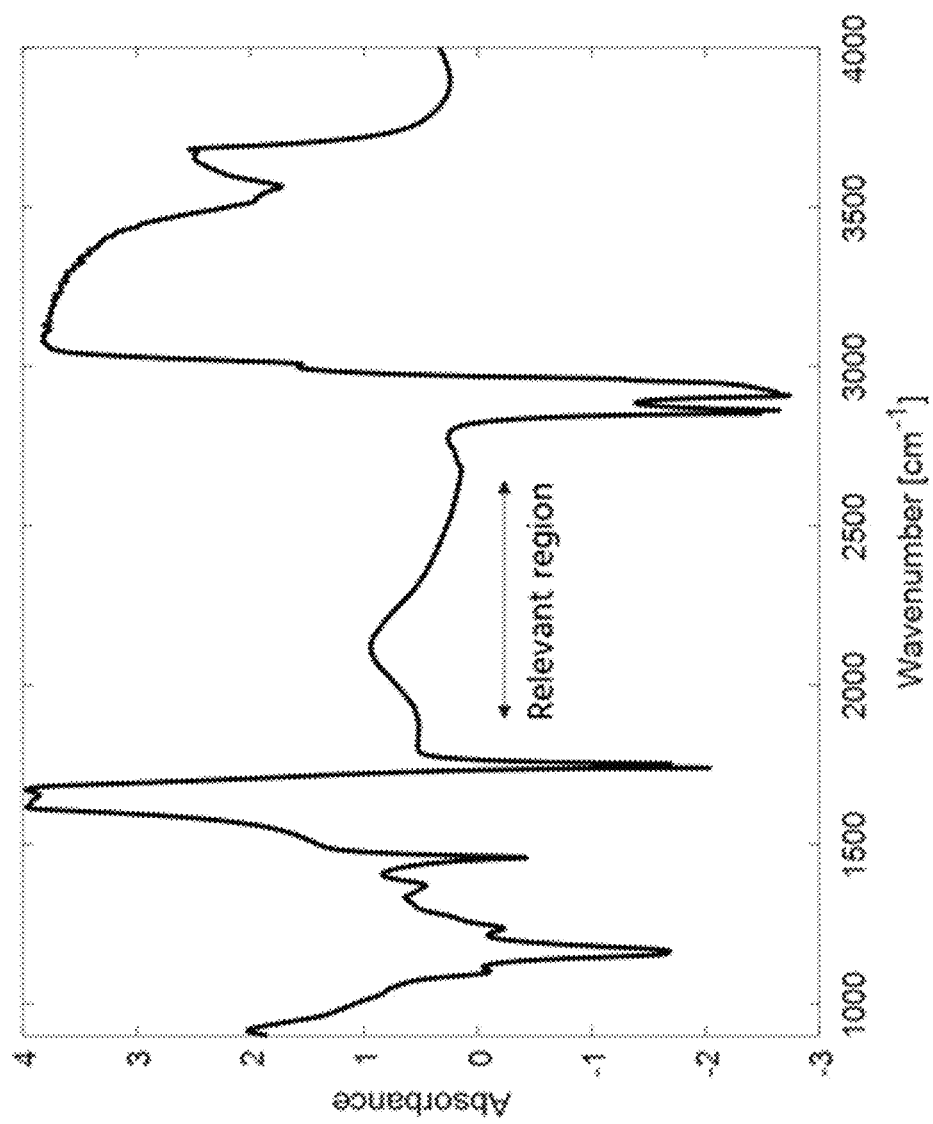

METHOD OF DETERMINING AN OPTICAL PATHLENGTH THROUGH A CUVETTE

CROSS-REFERENCE TO RELATED APPLICATIONS

This application is a National Stage of PCT/IB2020/059690, filed on Oct. 15, 2020, which claims priority to Danish Patent Application PA202000051, filed on Jan. 16, 2020 in the Danish Patent and Trademark Office, the entire contents of each of which are incorporated herein in their entirety.

BACKGROUND

The present invention relates to a method of determining an optical pathlength through a cuvette of a spectrophotometric apparatus and a method of correcting for a pathlength dependent amplitude change in the output of such an apparatus.

An optical spectrophotometric apparatus typically comprises a light emitter and a light detector which delimit opposite ends of a light-path into which a sample is positioned for analysis. A sample holder, such as comprising a sample cuvette for liquid or other flowable samples, is located in the light-path and used for positioning samples therein in a repeatable manner. A spectrometer, such as a monochromator or an interferometer, is also located in the lightpath to separate light from the light emitter into intensity dependent narrow spectral bands and to output the same for detection by the light detector and may be placed before or after the sample holder in the direction of travel of light from the light emitter to the light detector.

The sample holder has an internal sample receiving volume and is provided with surfaces, usually opposing surfaces, at least portions of which are transparent to the light traversing the light-path. The separation between these transparent portions determines the optical pathlength through the sample holder and thus through a sample which is being held in the sample receiving volume of the sample holder.

The usual manner of obtaining the necessary spectral data in any spectrophotometric apparatus is by generating a transmittance (or absorbance) spectrum of the sample. To do this a so-called single beam spectrum ($SB_S$) is obtained which comprises spectral data relating to the sample and to the components of the apparatus employed to generate it. In order to isolate the spectral data related only to the sample, a similar single beam spectrum ($SB_Z$) is typically measured on a so-called zero-material, such as water or a water based material if, for example, the sample to be measured is a liquid or air if, for example, the sample to be measured is a solid. Such single beam spectra ($SB_Z$) include the same effects which are related to the components of the apparatus as do the sample spectra ($SB_S$) but effects due to the sample are not present. The zero-material spectrum is then employed to provide a wavelength dependent zero level across the spectral region within which the spectral data is collected.

The single beam spectrum of the sample ($SB_S$) is subsequently divided by the single beam spectrum of the zero-material ($SB_Z$) at the same wavelengths throughout the respective spectra in order to obtain a so-called dual beam spectrum of the sample ($DB_S$) which is essentially the transmittance spectrum of the sample relative to the zero-material and relates virtually only to the transmission properties of the sample. As is well known, taking the negative $\log_{10}$ of this provides the absorbance spectrum for the sample. These operations are performed in an arithmetic unit of a computing device which is associated with the spectrophotometric apparatus and which is provided either integral with or separate but in operable connection to the apparatus, for example in the form of a suitably programmed personal computer.

Over time the output of the spectrophotometric apparatus tends to vary. An aspect of this variation may be described as an amplitude change as a result of which different amplitudes are measured at the same wavelengths for the same sample in two otherwise similar spectrophotometric apparatus or at two runs of the same spectrophotometric apparatus at different times. This is typically caused by the wear of the sample holder causing a change in the separation between the opposing transparent portions and hence to a change in the optical pathlength through the sample holder. As is known, according to the Beer-Lambert law, the absorbance of light by a sample at a given energy (wavelength or wavenumber) is proportional to the optical pathlength through the sample. Thus as the sample holder wears and the optical pathlength changes then the amplitude of the output of the spectrophotometric apparatus changes and needs to be compensated for at regular intervals.

In order to compensate for an amplitude change of the output of the spectrophotometric apparatus due to wear of the sample holder it is known, from for example U.S. Pat. No. 5,933,792 to employ dual beam spectrometric measurements on a so-called standardisation liquid (also often referred to as an "equalization liquid"). This standardisation liquid is a liquid that has a precisely controlled chemical composition resulting in an optical spectrum recorded by the spectrometer which shows a characteristic pattern with characteristic intensities in a predetermined frequency range. The standardisation liquid described in U.S. Pat. No. 5,933,792, is propanol in water. Intensity information relating to the pattern is compared in the arithmetic unit to corresponding intensity information relating to the reference pattern that has previously been defined as the desired standard response from the standardisation liquid. Then, based on the comparison, the arithmetic unit generates a mathematical transform which describes the transformation of the intensities of the pattern of the optical spectrum recorded by spectrophotometric apparatus to those of the desired standard response the reference pattern. This mathematical transform is stored for access by the arithmetic unit for application to optical spectra of unknown samples that are subsequently recorded by the spectrophotometric apparatus in order to generate an optical spectrum in which amplitude changes due to sample holder wear are compensated for. A problem with this known compensation method is that it requires that the composition of the standardisation liquid is exactly controlled.

A method to compensate for amplitude changes in the output of the spectrophotometric apparatus without using a specially composed standardisation liquid is known from U.S. Pat. No. 9,874,515. Here, the liquid zero-material, which is typically water and which requires no difficult fabrication, is used instead of the separate standardization liquid. The single beam spectrum of the zero-material ($SB_Z$), typically water, is employed in determining a mathematical transform which, again, describes a transformation of a spectrum recorded by the spectrophotometric apparatus to one which is unaffected by sample holder wear. Unfortunately, the so recorded zero beam absorption spectrum ($SB_Z$) includes information not only on the zero-material in the cuvette but also background information on elements, including those in atmospheric air and those associated with optical components, within the light-path between the light emitter and the light detector which is unrelated to the zero material but which influences the light intensity. In order to remove this background information, one solution proposed by U.S. Pat. No. 9,874,515 is to determine a single beam absorption spectrum for air ($SB_A$) which will then contain the same background information as that of the zero beam absorption spectrum ($SB_Z$) of the water but, of course, without any contribution from water. Thus a dual beam spectrum of the zero-material ($DB_Z$), being essentially the transmittance spectrum of the zero-material relative to air, will relate virtually only to the transmission properties of the zero-material. However, the separation between the opposing transparent windows of the typical cuvette is around 50 μm. This makes it difficult to ensure that all sample is removed and only air is present in the cuvette during such background measurements. Dismantling and thoroughly drying the cuvette for each compensation measurement is impractical, as is replacing the sample cuvette with a dry one for each compensation measurement. Moreover, interference fringes in the recorded spectra which arise upon the introduction of air into the cuvette due to multiple reflections from the cuvette windows further complicate the analysis.

Another solution proposed in U.S. Pat. No. 9,874,515 is to make a mathematical estimation of the background information. However, such an estimation has shown to be insufficiently accurate in certain circumstances and for certain applications.

SUMMARY

It is an aim of the present invention to mitigate one or more of the problems associated with at least one of the known methods.

According to a first aspect of the present invention there is provided a method A method for determining an optical pathlength of a cuvette of a spectrophotometric apparatus, the spectrophotometric apparatus including a spectrometer and having associated therewith a computing device, the method comprising: obtaining into the computing device by means of the spectrometer a single beam spectrum of a liquid zero-material held in the cuvette at least in a first energy region in which the liquid zero-material absorbs; obtaining into the computing device by means of the spectrometer a single beam spectrum of a second liquid at least in the first energy region, the second liquid replacing the liquid zero material in the cuvette and having a composition excluding the liquid zero-material and having no absorption in the first energy region; determining in the computing device a dual beam spectrum of the liquid zero-material relative to the second liquid at least in the first energy region from the two single beam spectra; and calculating in the computer device an optical pathlength through the cuvette in dependence of spectral information obtained from the first energy region of the determined dual beam spectrum. Since the energy region employed is that in which the second liquid shows no appreciable absorption then it is not critical that the amounts of components of the second liquid which give rise to characteristic absorptions is controlled.

In some embodiments the liquid zero material is water. This has an advantage that no special preparation, such as precise mixing of chemical components, is necessary.

In some embodiments the second liquid and the liquid zero-material are immiscible (at least to the extent that the presence of one liquid in the other is in amounts that does not detectably alter the single beam spectrum recorded for that other liquid), for example the second liquid is a hydrophobic liquid, such as a vegetable oil, a siloxane based oil (for example a silicone oil) or a mineral oil, when the liquid zero-material is water. This helps to ensure that the second liquid and the liquid zero-material can be completely exchanged for measurement of their respective single beam spectra.

According to a second aspect of the present invention there is provided a method of correcting for an amplitude change in an output of a spectrophotometric apparatus, the spectrophotometric apparatus including a cuvette for holding a liquid sample and a spectrometer and having associated therewith a computing device, the method comprises exposing an unknown liquid sample in the cuvette to electromagnetic radiation at a plurality of energies; obtaining into the computing device using the spectrometer a single beam spectrum of the unknown liquid sample; determining in the computing device a dual beam spectrum of the unknown liquid sample relative to a liquid zero-material; and applying by means of the computer device a mathematical transform to the dual beam spectrum to correct for an amplitude change in the output of the spectrophotometric apparatus, which mathematical transform describes a transformation of the amplitude values of the determined dual beam spectrum to a desired amplitude values; wherein the mathematical transform is dependent on an optical pathlength of the cuvette calculated by the method according to the first aspect of the present invention.

As will be appreciated by the skilled artisan, the energy of electromagnetic radiation employed in and/or detected by the spectrophotometric apparatus may be expressed using a number of inter-related units such as wavenumber, wavelength, frequency or channel number whilst remaining within the scope of the invention as described and claimed.

BRIEF DESCRIPTION OF THE DRAWINGS

The aforementioned and other advantages associated with the present invention will become apparent from a consideration of the following description of aspects of non-limiting exemplary embodiments of the present invention which is made with reference to the accompanying figures, of which:

FIG. 5 shows a dual beam spectrum of water relative to vegetable oil.

DETAILED DESCRIPTION

Figure 1:
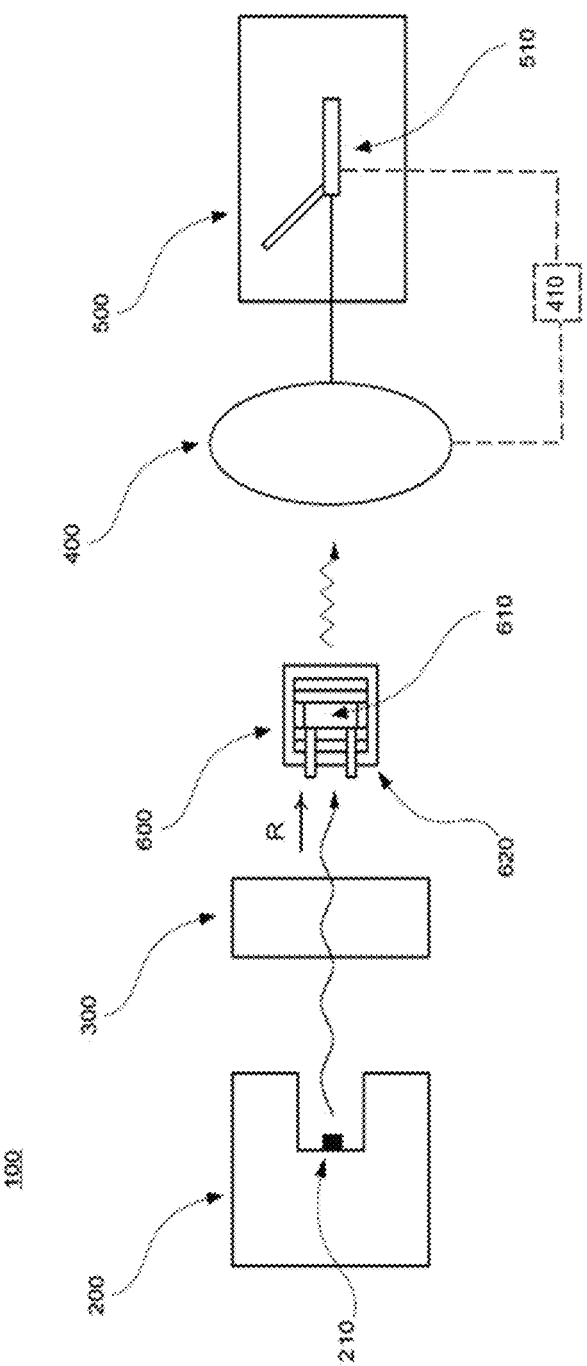
FIG. 1 Illustrates schematically an embodiment of a spectrophotometric apparatus operating according to the method of present invention.

In the following, an embodiment of the spectrophotometric apparatus 100 will be described with reference to FIG. 1 and FIG. 2 in the context of absorption spectroscopy. The apparatus 100 comprises a radiation device 200, a spectrometer 300, which in the present embodiment is an interferometric arrangement, a detector 400, a measuring device 500 and a sample holder 600 for holding a sample to be analysed.

Figure 2:
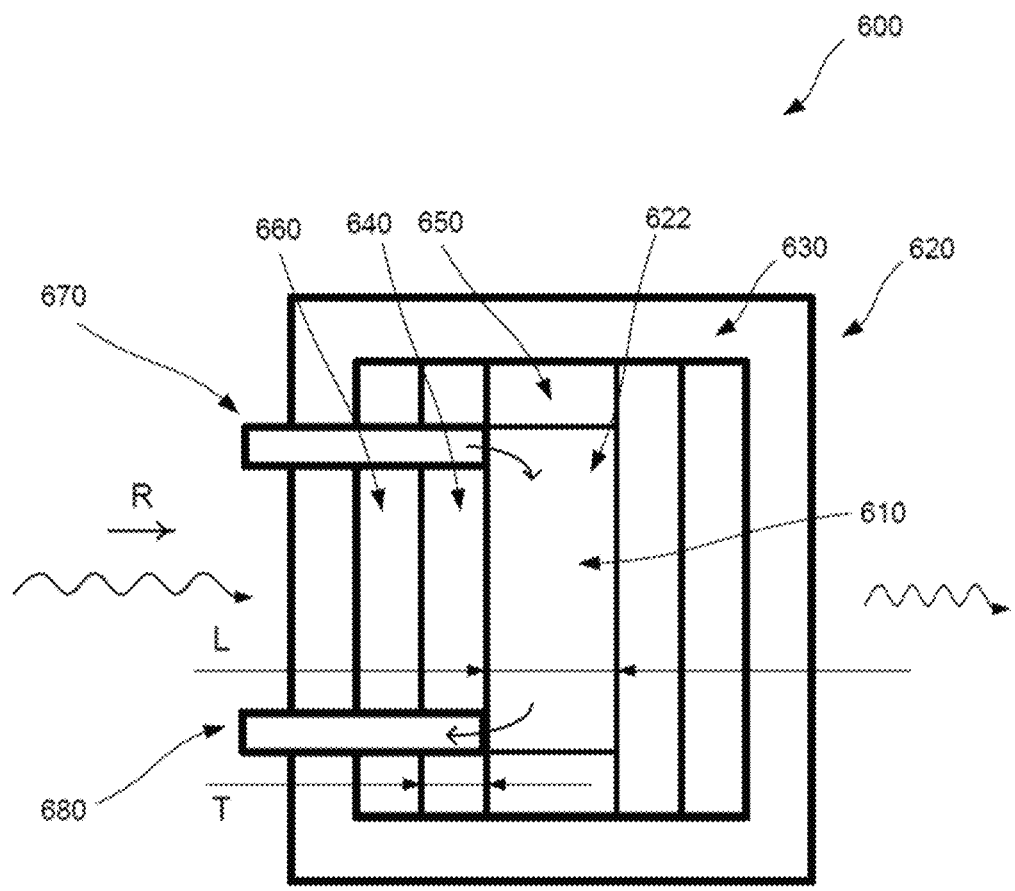
FIG. 2 Illustrates a schematic cross-sectional top view of the sample holder illustrated in FIG. 1.

The radiation device 200 comprises a radiation source 210 which is arranged to emit polychromatic radiation from within some or all of the ultraviolet to infrared energy range of the electromagnetic spectrum in the direction as indicated by the letter R in FIGS. 1 and 2. In the present embodiment, and by way of example only, the radiation source 210 is configured to emit only from within the infrared energy range. It will be appreciated that the energy range is to be selected in dependence of the expected absorption characteristics of the types of liquid sample to be measured by the apparatus 100 and may typically extend from within an energy region (or regions) between the ultraviolet and the infrared energy ranges of the electromagnetic spectrum.

The spectrometer 300 of the present embodiment comprises necessary equipment for implementing Fourier transform spectroscopy, as is well-known to a person skilled in the art. For example, the spectrometer 300 comprises a collimator which collimates the infrared radiation and additional equipment comprised in an interferometer, for example optical components such as moveable and static mirrors, beam splitters and lenses. Other equipment for implementing other types of optical spectrometer known in the art may be employed in other embodiments.

The detector 400 is arranged to detect incoming infrared radiation which has been transmitted through the sample holder 600, see further below.

The measuring device 500 is connected to the detector 400 for collecting unprocessed data about the detected infrared radiation and transmits it to an associated computing device 510. The computing device 510 is connected to, and in some embodiments is integral with, the measuring device 500 by means of a connection, which may be wired or wireless. The measuring device 500 is, by means of this computing device 510, configured to determine a transmittance in a discrete number of channels positioned equidistantly along a wavenumber axis. The computing device 510 comprises a processor for processing the collected data, suitable computing software, as well as additional equipment well-known to a person skilled in the art. Moreover, the computing device 510 is arranged to store the collected data and the processed data in an associated memory. According to the present embodiment, a routine using Fourier transform algorithms is used in order to transform the unprocessed data from the detector 400 into data about the intensity as a function of the wavenumber. Additionally, the computing device 510 may be configured to operate to present the data graphically in terms of two-dimensional plots, see FIGS. 4 and 5 referred to below.

Further below, a method for correcting intensity deviations (also referred to as 'amplitude changes') of this spectrophotometric apparatus 100 will be described.

The sample holder 600 is, in the present embodiment, placed between the interferometric arrangement which forms the spectrometer 300 and the detector 400. Furthermore, the sample holder 600 is arranged to hold a liquid sample 610 which is to be spectrally analysed, here by monitoring infrared radiation transmitted through it and generating a single beam spectrum $SB_S$ therefrom. In the present embodiment, a water sample 610 is employed as a reference or so-called "zero" fluid and is used in order to perform a determination of a cuvette pathlength and corrections to the amplitude of signals recorded by the spectrometer dependent thereon in a manner according to the present invention, see further below. The water sample 610 is placed in a cuvette 620 of the sample holder 600, which cuvette 620 is in part made out of calcium fluoride. The outer surface of the cuvette 620 is shaped as a rectangular parallelepiped. The cuvette 620 comprises inner walls 630, window elements 640, spacers 650, cavities 660 and a sample space 622 for holding the liquid sample 610, see the cross-sectional top view in FIG. 2. The inner walls 630 and the window elements 640 are transparent to the infrared radiation which is emitted by the radiation source 210 and sent through the liquid sample 610. It is noted that the spacers 650 do not need to be transparent. For example, the spacers 650 may be comprised out of a plastic. The volume of the sample space 622 may be varied by varying the extension of the spacers 650. Furthermore, there is an inlet 670 for introducing the liquid sample 610 into the sample space 622 and an outlet 680 for removing the liquid sample 610 from the space 622. According some embodiments, the liquid sample 610 is kept in motion during the measurement, flowing from the inlet 670 to the outlet 680 via the sample space 622, as indicated by the arrows in FIG. 2. In other embodiments, however, the liquid sample 610 is kept stationary in the sample space 622 during the measurement, in which embodiments the inlet 670 and the outlet 680 may be omitted.

The distance covered by the infrared radiation in the sample space 622 is referred to as an optical pathlength L. Since, in the present embodiment the radiation is transmitted through the liquid sample 610 at right angles with respect to a side edge of the cuvette 620, in the direction R in FIG. 1 and FIG. 2, the optical pathlength L coincides with an inner length extension of the cuvette 620, between the window elements 640. If the cuvette 620 wears down, the optical pathlength L will change (increase).

In other embodiments the optical radiation which is measured in the spectrometer may be radiation which has traversed the liquid sample 610 in the sample space 622 a plurality of times (for example after reflection from a one of the window elements 640). In such embodiments the optical pathlength L will not coincide with the inner length extension of the cuvette 620 but will be some multiple of this depending, in a known manner, on the detection geometry of the system. However, it will be appreciated that the optical pathlength L will still depend on the inner length extension such that any changes to this inner length extension will manifest as changes in amplitude of optical radiation detected by the detector 400.

In fact, since the window elements 640 making contact with the water sample 610 are made from calcium fluoride, they will be dissolved over time. During its lifetime, the cuvette 620 may also have been deteriorated by other chemicals. For example, the thickness T (see FIG. 2) of the window elements 640 will become smaller over time. Consequently, the separation between the window elements 640 will increase over time and give rise to changes in the optical pathlength L. In addition, cuvettes 620 placed in different apparatuses of the same type 100 may have different optical pathlengths L. For instance, differing optical pathlengths L may have resulted from having dissolved the window elements 640 of the cuvettes 620 to differing degrees, even if the cuvettes 620 have been substantially similar at some point in time. Moreover, the extension of the spacers 650 may vary between different cuvettes 620, thereby giving rise to varying optical pathlengths L. Therefore, in order to make the characteristics of different apparatuses of the same type 100 more similar and the characteristics of a same apparatus 100 more stable over time, the optical pathlength L need to be determined and any changes compensated for.

Figure 3:
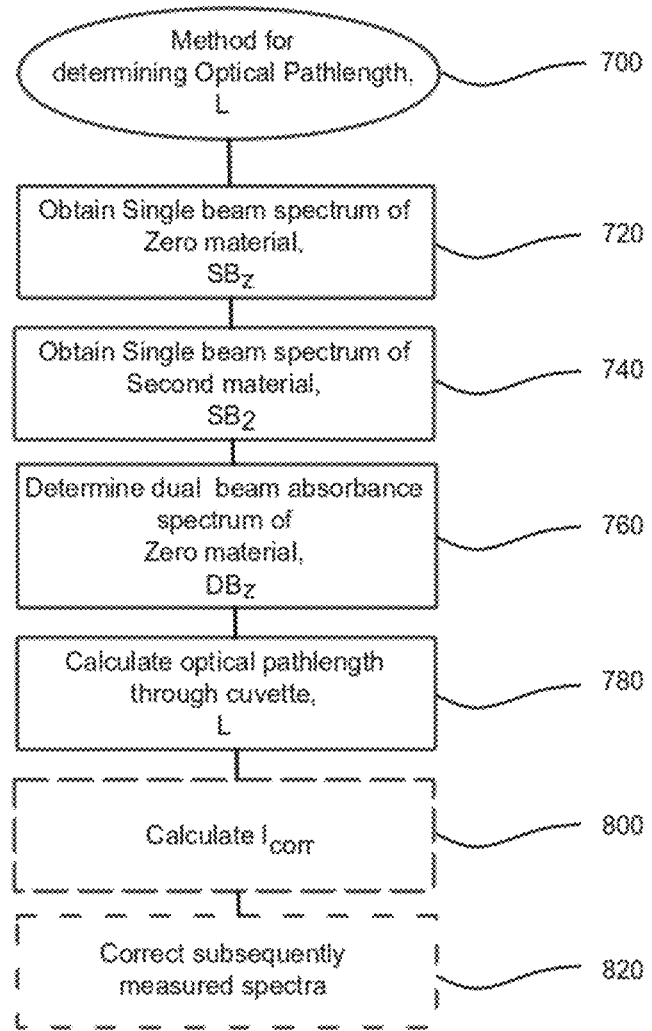
FIG. 3 is a block diagram illustrating a method of determining an optical pathlength and a correction factor according to the present invention.

A method 700 for determining an optical pathlength L of a cuvette 620 is described with reference to the flow diagram of FIG. 3. The description is exemplified with respect to the spectrophotometric apparatus 100 depicted in FIG. 1 and FIG. 2, the detector 400 of which is arranged to detect incoming infrared radiation which is transmitted through the sample holder 600 along an optical lightpath of pathlength L at right angles with respect to a side edge of the cuvette 620, in the direction R in FIG. 1 and FIG. 2, which then coincides with an inner length extension of the cuvette 620, between the window elements 640.

According to the present exemplary embodiment the method utilizes the single beam spectrum $SB_Z$ of the liquid zero-material sample, which is here a nominally pure water sample (the water sample may contain small amounts of other components, such as around 0.01% by volume detergent, which do not impact the measured single beam spectrum $SB_Z$), for detecting the optical pathlength L through the cuvette 620. After the spectrophotometric apparatus 100 has been corrected using measurements on the water sample, it may be used for measurements on other liquid samples, such as milk or wine in order to make quantitative determinations of components of interest in these samples in a manner well known in the art.

Figure 4:
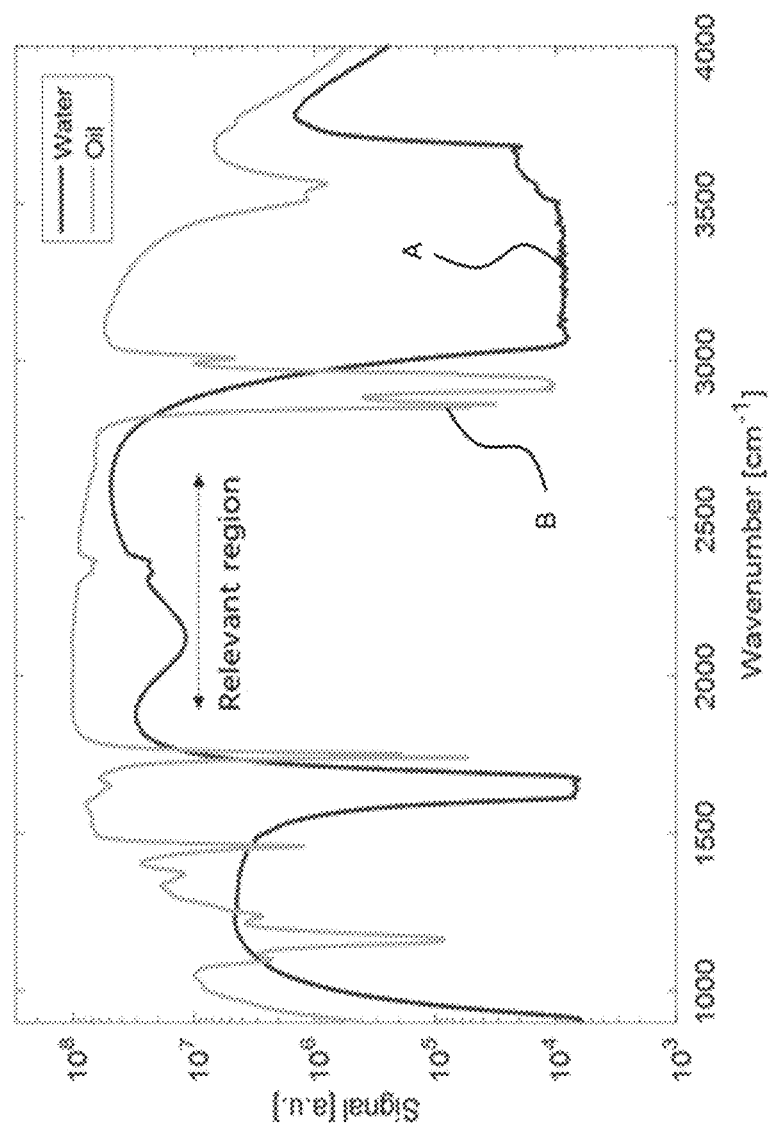
FIG. 4 shows a single beam spectrum of water and a single beam spectrum of vegetable oil.

At a step 720 the liquid zero-material is introduced into sample space 622 and a single beam spectrum of the zero liquid sample $SB_Z$ is obtained into the computing device 510 using the spectrometer 300. Such a spectrum A is illustrated in FIG. 4 which illustrates a plot of the intensity of detected radiation (here in the infrared portion of the electromagnetic spectrum) indexed against wavenumber and is collected at least in a first energy region (identified as "Relevant region" in the figure) at which the zero liquid material absorbs at least a portion of the incident optical radiation emitted by the radiation source 210.

At a step 740 the liquid zero-material sample 610 in the cuvette 620 is replaced with a second liquid sample which is characterised by having a composition excluding the liquid zero-material and by having no absorption in the first energy region. A single beam spectrum of the second liquid sample $SB_2$ is obtained into the computing device 510, again using the spectrometer 300. An example of such a spectrum B is also illustrated in FIG. 4 for a vegetable oil which is here, for example, corn oil and is collected at least in the first energy region.

It is generally preferred that the second liquid is immiscible with the zero liquid. This helps ensure that the liquid 610 already in the cuvette 620, which here by way of example is the zero liquid, is completely replaced by the other liquid, which here by way of example is the second liquid. It will be appreciated that the order of performing the steps 720 and 740 may be reversed so that the zero liquid replaces the second liquid in the cuvette 620 for measurement. In the present example, in which the liquid zero-material is water, the hydrophobic second liquid may be, for example, a liquid selected from a vegetable oil, such as sunflower, olive, corn or grape oil; a siloxane based oil, such as a silicone oil; and a mineral oil.

At a step 760 the computing device 510 operates to determine a dual beam spectrum of the zero material relative to the second material $DB_Z$ and an absorbance spectrum therefrom, at least in the first energy region. Such a dual beam absorbance spectrum is illustrated in FIG. 5.

At a step 780 the optical pathlength L through the cuvette 620 is calculated in the computing device 510. In some embodiments this is done from the application of the Beer-lambert law to the absorbance spectrum in the first energy region which is determined at the step 760, using a knowledge of the molar absorptivity of water. In some embodiments this optical pathlength L is determined from the application of a chemometric model, such as a PLS model, which links features in the absorbance spectrum to the optical pathlength L through the cuvette 620. This model is generated in a manner well known in the art of chemometrics from a multivariate data analysis, such as a Partial Least Squares (PLS) analysis, of a plurality of dual beam absorbance spectra of water (or generally a "liquid zero material") relative to the oil (or generally a "second liquid") obtained using cuvettes 620 having different known reference optical pathlengths $L_{ref}$.

In some situations it may be appropriate to incorporate one or more additional variables in the multivariate analysis. An example of such other variable which may affect the absorbance spectra collected by the spectrophotometric apparatus 100 is temperature. In this case the spectra that are collected for use in generating the model are also collected at different known temperatures, preferably across a temperature range spanning temperatures expected to be experienced by the apparatus 100 during normal operation. Thereby, variations in the one or more other variables may be compensated for in the finally calculated of optical pathlength L.

In some embodiments the so-calculated optical pathlength L may be compared in the computing device 510 with a preset value and a difference ΔL determined. The computing device 510 may then be programmed to generate a warning, indicating that the cuvette 620 has become excessively worn and requires replacing, when the difference ΔL exceeds or equals a preset value.

Knowledge of the actual optical pathlength L as determined at step 780 may be employed in some embodiments in the calculation in the computing device 510 of a correction factor $I_{corr}$ for use in correcting for the effects of changes in the optical pathlength on the intensities of radiation measured by the spectrophotometric apparatus 100.

According to a second aspect of the present an additional step 800 is provided at which the correction factor $I_{corr}$ is determined in the computing device 510 as dependent on a ratio of a nominal optical pathlength $L_0$ to the determined optical pathlength L.

In some embodiments a step 820 is provided at which subsequently obtained spectra are corrected using this correction factor $I_{corr}$.

At this step 820 $I_{corr}$ may be employed in the computing device 510 in order to correct measured intensities $A_m$ to those ($A_{nom}$) expected at the nominal pathlength $L_0$ by applying, for example, the relationship $$A_{nom} = I_{corr} \cdot A_m.$$

In some embodiments, at this step 820, the correction factor $I_{corr}$ may be employed in the computing device 510 to generate a control signal dependent on this correction factor $I_{corr}$ by which a gain stage 410 of the detector 400 may be set in order to correct the amplitudes of measured intensities of incident radiation to those expected at the nominal optical pathlength $L_0$.

In some embodiments the x axis (or wavenumber scale) of the single beam spectra collected using the spectrometer 300 of the spectrophotometric apparatus 100 is standardized before the y axis (amplitude) correction is performed (i.e before the correction factor $I_{corr}$ is applied). This may be achieved in a manner that is well known in the art by applying a mathematical transform to the single beam spectrum by which transform measured data is standardized along the x axis. In some embodiments, the x axis standardisation is based on the $CO_2$ peak of air in the infrared range, as described below.

As is known, this x axis standardisation may comprise standardising the wavenumber scale of an optical spectrum recorded by the apparatus 100 by providing an optical spectrum recorded by the apparatus 100 and comprising spectral patterns originating from constituents of atmospheric air in the light path in the apparatus 100; selecting a spectral pattern originating from constituents of atmospheric air in the apparatus 100, here $CO_2$ in air; determining one or more wavenumber dependent position values associated with the selected spectral pattern; constructing a mathematical transform based on a difference between the determined value or values and a corresponding reference value or values of the selected spectral pattern and applying the mathematical transform to optical spectra subsequently recorded by the apparatus 100 to standardise the wavenumber scale.

The invention claimed is:

1. A method for determining an optical pathlength through a cuvette of a spectrophotometric apparatus, the spectrophotometric apparatus including a radiation device, a spectrometer, and having associated therewith a computing device, the method comprising:
   obtaining into the computing device, based on operating the spectrometer, a first single beam spectrum of a liquid zero-material held in the cuvette at least in a first energy region in which the liquid zero-material absorbs at least a portion of incident optical radiation that is received from the radiation device;
   obtaining into the computing device a second single beam spectrum of a second liquid at least in the first energy region, the second liquid replacing the liquid zero-material in the cuvette and having a composition excluding the liquid zero-material and having no absorption of incident optical radiation emitted by the radiation device in the first energy region;
   determining, in the computing device, a dual beam spectrum of the liquid zero-material relative to the second liquid at least in the first energy region from the first and second single beam spectra, the determining the dual beam spectrum including, for at least one wavenumber of the dual beam spectrum within the first energy region, determining an intensity amplitude of the dual beam spectrum at the wavenumber as a difference between an intensity amplitude of the first single beam spectrum at the wavenumber and an intensity amplitude of the second single beam spectrum at the wavenumber; and
   calculating in the computer device the optical pathlength through the cuvette, based on processing spectral information obtained from at least one intensity amplitude in the first energy region of the determined dual beam spectrum.

2. The method of claim 1, wherein
   the optical pathlength is calculated by applying, in the computer device, a mathematical model to the spectral information obtained from the at least one intensity amplitude in the first energy region of the determined dual beam spectrum, the mathematical model constructed to link features of the spectral information to the optical pathlength, and
   the mathematical model is constructed using chemometric analysis of spectral information obtained from a plurality of dual beam spectra of the liquid zero-material relative to the second liquid, each dual beam spectrum of the plurality of dual beam spectra being determined at a different known reference optical pathlength of a plurality of different known reference optical pathlengths.

3. The method of claim 2, wherein the plurality of dual beam spectra are obtained under a plurality of different known temperature values.

4. The method of claim 1, wherein the second liquid is immiscible with the liquid zero-material.

5. The method of claim 4, wherein the liquid zero-material is water and the second liquid is a hydrophobic liquid.

6. The method of claim 5, wherein the hydrophobic liquid is a vegetable oil.

7. The method of claim 5, wherein the hydrophobic liquid is a siloxane-based liquid.

8. The method of claim 7, wherein the hydrophobic liquid is a silicone oil.

9. The method of claim 5, wherein the hydrophobic liquid is a mineral oil.

10. A method of correcting for an amplitude change in an output of a spectrophotometric apparatus, the spectrophotometric apparatus including a cuvette configured to hold a liquid sample, a spectrometer, a radiation device, a detector, and a computing device, the method comprising:
    applying, based on operating the computing device, a mathematical transform to a determined dual beam spectrum of the liquid sample relative to a liquid zero material to correct for the amplitude change in the output of the spectrophotometric apparatus, the mathematical transform describing a transformation of determined amplitude values of the determined dual beam spectrum to desired amplitude values, the applying including
        obtaining amplitudes of measured intensities of a sample spectrum of optical radiation detected at the detector based on causing the radiation device and the spectrometer to direct optical radiation through the cuvette holding the liquid sample, and
        multiplying the measured intensities by the mathematical transform to obtain corrected amplitudes of the measured intensities of the sample spectrum,
    wherein the mathematical transform is dependent on an optical pathlength of the cuvette calculated according to the method of claim 1.

11. The method of claim 1, further comprising:
    comparing the calculated optical pathlength to a present pathlength value to determine a difference value; and
    generating a warning signal in response to a determination that the difference value is equal to or greater than a preset value.

12. The method of claim 1, wherein the calculating the optical pathlength includes
    taking a negative log 10 of the dual beam spectrum to obtain an absorbance spectrum, and
    applying at least one intensity amplitude of the absorbance spectrum in the first energy region to a Beer-Lambert law proportional relationship between absorbance of optical radiation by a sample at a given wavenumber to the optical pathlength, based on a molar absorptivity of the liquid zero-material, to determine the optical pathlength.

13. The method of claim 10, wherein the mathematical transform is a ratio of the calculated optical pathlength to a nominal optical pathlength value.

14. The method of claim 10, further comprising:
    processing the corrected amplitudes of the measured intensities of the sample spectrum to determine one or more chemical components of the liquid sample.

15. A spectrophotometric apparatus, comprising:
a radiation device configured to emit optical infrared radiation;
a sample cuvette configured to hole a sample and to direct optical infrared radiation therethrough;
a detector configured to detect optical radiation transmitted through the sample cuvette from at least the radiation device;
a spectrometer configured to separate the optical infrared radiation that is emitted by the radiation device into intensity dependent spectral bands and to output the spectral bands for detection by the detector; and
a computing device, the computing device configured to
obtain, based on operation of the radiation device, the spectrometer, and the detector, a first single beam spectrum of a liquid zero-material held in the sample cuvette at least in a first energy region in which the liquid zero-material absorbs at least a portion of incident optical radiation that is received from the radiation device,
obtain, based on operation of the radiation device, the spectrometer, and the detector, a second single beam spectrum of a second liquid at least in the first energy region, the second liquid replacing the liquid zero-material in the sample cuvette and having a composition excluding the liquid zero-material and having no absorption of incident optical radiation emitted by the radiation device in the first energy region,
determine a dual beam spectrum of the liquid zero-material relative to the second liquid at least in the first energy region from the first and second single beam spectra, the determining the dual beam spectrum including, for at least one wavenumber of the dual beam spectrum within the first energy region, determining an intensity amplitude of the dual beam spectrum at the wavenumber as a difference between an intensity amplitude of the first single beam spectrum at the wavenumber and an intensity amplitude of the second single beam spectrum at the wavenumber, and
calculate an optical pathlength through the sample cuvette, based on processing spectral information obtained from at least one intensity amplitude in the first energy region of the determined dual beam spectrum.

16. The spectrophotometric apparatus of claim 15, further comprising:
a gain stage device that is configured to apply a correction factor to amplitudes of measured intensities of a sample spectrum of optical radiation detected at the detector based on causing the radiation device and the spectrometer to direct optical radiation through the sample cuvette holding a liquid sample to obtain corrected amplitudes of the measured intensities of the sample spectrum,
wherein the correction factor is a ratio of the calculated optical pathlength to a nominal optical pathlength value.

17. The spectrophotometric apparatus of claim 16, wherein the computing device is further configured to:
process the corrected amplitudes of the measured intensities of the sample spectrum to determine one or more chemical components of the liquid sample.

18. The spectrophotometric apparatus of claim 16, wherein the computing device is further configured to:
compare the calculated optical pathlength to a present pathlength value to determine a difference value; and
generate a warning signal in response to a determination that the difference value is equal to or greater than a preset value.

* * * * *